Patented May 1, 1951

2,551,336

UNITED STATES PATENT OFFICE 2,551,336

REDUCTION ACTIVATED PEROXY COMPOUND CATALYZED SYNTHETIC RUBBER EMULSION POLYMERIZATIONS

Raoul L. Provost and Frederick J. Foster, Cheshire, Conn., assignors to United States Rubber Company, New York, N. Y., a corporation of New Jersey No Drawing. Application October 6, 1949, Serial No. 119,989

6 Claims. (Cl. 260—84.1)

This invention relates to improvements in reduction activated peroxy compound catalyzed synthetic rubber emulsion polymerizations, or so-called redox polymerizations.

Increasing the reaction rate of peroxy compound catalyzed synthetic rubber emulsion polymerizations by including reducing agents with the peroxy catalyst is well known. Ferrous salts, such as ferrous pyrophosphate, which may be formed from a water-soluble ferrous salt, such as ferrous sulfate or ferrous chloride and alkali pyrophosphate, are commonly used as reduction activators for the peroxy catalyst. More recently, ferrous sulfide, which may be formed from a water-soluble ferrous salt such as ferrous sulfate or ferrous chloride and an alkali sulfide such as sodium sulfide or sodium hydrosulfide (sodium sulfhydrate), has been used as a reduction activator for the peroxy catalyst to give improved results in the polymerization and improved properties in the final synthetic rubber polymer, as disclosed by Smith et al.; Ind. & Eng. Chem., 41, 1584–1587 (1949). It has been found, however, that the use of ferrous sulfide as an activator in peroxy compound catalyzed synthetic rubber polymerizations has the serious disadvantage in that upon completion of the polymerization, large quantities of a brown scum floated to the surface of the latex. This makes the latex unfit for sale, especially where the latex is to be used directly in manufacturing processes.

By the present invention, ferrous sulfide activated peroxy compound catalyzed synthetic rubber emulsion polymerizations may be carried out without any resultant scum appearing in the final synthetic rubber latex.

According to the present invention, the ferrous sulfide activated peroxy compound catalyzed synthetic rubber emulsion polymerization is carried out in the presence of an alkali tartrate or an alkali citrate. The term "alkali" as applied to the tartrates and citrates is used herein in its conventional meaning as including alkali-metal and ammonium tartrates and citrates, but excluding the alkaline-earth and other polyvalent metal tartrates and citrates. The alkali tartrate may be the mono- or di-sodium, potassium, ammonium, or mixed alkali tartrate, and the alkali citrate may be the mono- or di- or tri-sodium, potassium, ammonium, or mixed alkali citrate. The polymerization may be made to take place at any desirable temperature as from 0° F. to 150° F. (from 0° F. to 35° F. with the aid of an anti-freeze—see Process Problems in Low-Temperature Emulsion Polymerization in Rubber Chem. & Tech., 22, 405–426). The catalyst may be conventional peroxy compound catalyst, such as the persalts, e. g. alkali persulfates, alkali-perborates, alkali percarbonates; hydrogen peroxide; or organic peroxides, e. g. acyl peroxides such as diacetyl peroxide, dibenzoyl peroxide, acetyl benzoyl peroxide, and alkyl peroxides such as tertiary butyl hydroperoxide, and aralkyl peroxides such as cumene hydroperoxide (alpha, alpha-dimethylbenzyl hydroperoxide). Some of such peroxy catalysts, as is known, are more effective than others in low temperature polymerizations. Conventional polymerization regulators such as primary and tertiary aliphatic mercaptans having 6 to 18 carbon atoms ($C_6$ to $C_{12}$), and aromatic mercaptans may be used to regulate the polymer chain length. The emulsifier for the polymerizable monomers may be a conventional soap or other surface-active emulsifying and dispersing agent. After the desired conversion of polymerizable monomers to synthetic rubber, the polymerization may be stopped by the addition of a conventional shortstopping agent such as hydroquinone, di-tert-butyl-hydroquinone, or dinitrochlorobenzene, and gaseous unreacted monomers vented off and liquid unreacted monomers stripped as by a steam distillation. If desired, the synthetic rubber latex may be coagulated by salt and/or acid in known manner.

The polymerizable material for the preparation of the synthetic rubber latex may be one or more butadienes-1,3, for example, butadiene-1,3, 2-methyl-butadiene-1,3 (isoprene), 2,3-dimethyl-butadiene-1,3, piperylene, or a mixture of one or more such butadienes-1,3 with one or more other polymerizable compounds which are capable of forming rubbery copolymers with butadienes-1,3, for example, up to 70% by weight of such mixture of one or more compounds which contain a $CH_2=C<$ group where at least one of the disconnected valences is attached to an electronegative group, that is, a group which substantially increases the electrical dissymmetry or polar character of the molecule, such group being other than H or $CH_3$. Examples of compounds which contain a $CH_2=C<$ group and are copolymerizable with butadiene-1,3 hydrocarbons are aryl olefines, such as styrene and vinyl naphthylene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride.

The following example is illustrative of the invention, all parts and percentages referred to herein being by weight.

Three reactor charges were made up according to the formulations shown in the table below:

| | I | II | III |
|---|---|---|---|
| | Parts by Weight | Parts by Weight | Parts by Weight |
| Butadiene-1,3 | 70 | 70 | 70 |
| Styrene | 30 | 30 | 30 |
| Emulsifier | 3.5 | 3.5 | 3.5 |
| Tertiary alkyl mercaptans, Avg.$C_{12}$ | .14 | .14 | .17 |
| Cumene peroxide | .17 | .17 | .17 |
| $FeSO_4.7H_2O$ | .079 | .079 | .079 |
| NaHS | .018 | .018 | .018 |
| Potassium sulfate | .36 | .28 | |
| Potassium carbonate | | | .3 |
| Sodium potassium tartrate | | .08 | |
| Tripotassium citrate | | | .06 |
| Water | 55 | 55 | 55 |

The 55 parts of water in the above formulations include the water added to the reactor as such, and the water used to make up the various emulsions and solutions of the added reagents. The 3.5 parts of emulsifier comprise 2 parts of a potassium soap of a mixture of fatty acids and resin acids derived from tall oil, and 1.5 parts of a potassium alkyl naphthalene sulfonate commercial surface-active emulsifying agent. The tertiary mixed alkyl mercaptans having an average of 12 carbon atoms is a conventional polymerization regulator. Cumene hydroperoxide is the peroxy compound catalyst. The ferrous sulfate and sodium sulfhydrate gave .024 part of ferrous sulfide. The potassium sulfate or carbonate was added as a known viscosity reducer.

The above three batches were polymerized at 50° F. until approximately 60% conversion of butadiene and styrene to copolymer. At the end of the reaction a small amount of potassium oleate solution was added to each batch to further stabilize the latex. Unreacted butadiene was vented off and unreacted styrene was stripped by steam distillation at reduced pressure. The synthetic rubber latex of batch I which was not polymerized in the presence of an alkali tartrate or carbonate, contained a large amount of dark colored scum floating on the surface of the latex, whereas the synthetic rubber latices of batches II and III which were polymerized in the presence of an alkali tartrate and alkali citrate, respectively, according to the present invention, were free from dark colored scum.

The amount of peroxy compound catalyst is that conventionally used, and is generally less than 1% by weight of the polymerizable monomers initially present in the emulsion.

The amount of ferrous sulfide activator is also small, generally from .005 to .15% by weight of the polymerizable monomers initially present in the emulsion being used. The amount of alkali tartrate or alkali citrate is small and should be sufficient to supply tartrate or citrate radical in amount at least 1.5 times the weight of the ferrous sulfide used. Preferably the amount is sufficient to give 2 to 5 times the ferrous sulfide weight in tartrate or citrate radical content. Larger amounts of alkali tartrate or citrate may be used up to 50 times the weight of ferrous sulfide in tartrate or citrate radical content without affecting the function of the citrate or tartrate.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The process which comprises polymerizing in aqueous emulsion material selected from the group consisting of butadienes-1,3 and mixtures of butadienes-1,3 with compounds which contain a single $CH_2=C<$ group and are copolymerizable therewith, in the presence of a peroxy compound catalyst, ferrous sulfide activator prepared in situ by the interaction of a water-soluble ferrous salt and an alkali sulfide, and material of the group consisting of alkali tartrates and alkali citrates, the amount of ferrous sulfide being 0.005% to 0.15% by weight of the polymerizable monomers initially present in the emulsion, and the amount of alkali tartrate or citrate being sufficient to give 1.5 to 50 times the ferrous sulfide weight in tartrate or citrate radical content.

2. The process which comprises polymerizing in aqueous emulsion material selected from the group consisting of butadienes-1,3 and mixtures of butadienes-1,3 with compounds which contain a single $CH_2=C<$ group and are copolymerizable therewith, in the presence of a peroxy compound catalyst, ferrous sulfide activator prepared in situ by the interaction of a water-soluble ferrous salt and an alkali sulfide, and an alkali tartrate, the amount of ferrous sulfide being 0.005% to 0.15% by weight of the polymerizable monomers initially present in the emulsion, and the amount of alkali tartrate being sufficient to give 2 to 5 times the ferrous sulfide weight in tartrate radical content.

3. The process which comprises polymerizing in aqueous emulsion material selected from the group consisting of butadienes-1,3 and mixtures of butadienes-1,3 with compounds which contain a single $CH_2=C<$ group and are copolymerizable therewith, in the presence of a peroxy compound catalyst, ferrous sulfide activator prepared in situ by the interaction of a water-soluble ferrous salt and an alkali sulfide, and an alkali citrate, the amount of ferrous sulfide being 0.005% to 0.15% by weight of the polymerizable monomers initially present in the emulsion, and the amount of alkali citrate being sufficient to give 2 to 5 times the ferrous sulfide weight in citrate radical content.

4. The process which comprises polymerizing in aqueous emulsion a mixture of butadiene-1,3 and styrene in the presence of a peroxy compound catalyst, ferrous sulfide activator prepared in situ by the interaction of a water-soluble ferrous salt and an alkali sulfide, and material of the group consisting of alkali tartrates and alkali citrates, the amount of ferrous sulfide being 0.005% to 0.15% by weight of the polymerizable monomers initially present in the emulsion, and the amount of alkali tartrate or citrate being sufficient to give 1.5 to 50 times the ferrous sulfide weight in tartrate or citrate radical content.

5. The process which comprises polymerizing in aqueous emulsion a mixture of butadiene-1,3 and styrene in the presence of a peroxy compound catalyst, ferrous sulfide activator prepared in situ by the interaction of a water-soluble ferrous salt and an alkali sulfide, and an alkali tartrate, the amount of ferrous sulfide being 0.005% to 0.15% by weight of the polymerizable monomers initially present in the emulsion, and the amount of alkali tartrate being sufficient to give 2 to 5 times the ferrous sulfide weight in tartrate radical content.

6. The process which comprises polymerizing in aqueous emulsion a mixture of butadiene-1,3 and styrene in the presence of a peroxy compound catalyst, ferrous sulfide activator prepared in situ by the interaction of a water-soluble ferrous salt and an alkali sulfide, and an alkali citrate, the amount of ferrous sulfide being 0.005% to 0.15% by weight of the polymerizable monomers initially present in the emulsion, and the amount of alkali citrate being sufficient to give 2 to 5 times the ferrous sulfide weight in citrate radical content.

RAOUL L. PROVOST.
FREDERICK J. FOSTER.

REFERENCES CITED

The following references are of record in the file of this patent:

Smith et al. Ind. & Eng. Chem. 41, 1584–1587 (1949).